Dec. 6, 1938.    K. E. BEMIS    2,138,813
BARBECUE MACHINE
Filed April 19, 1938    3 Sheets-Sheet 1
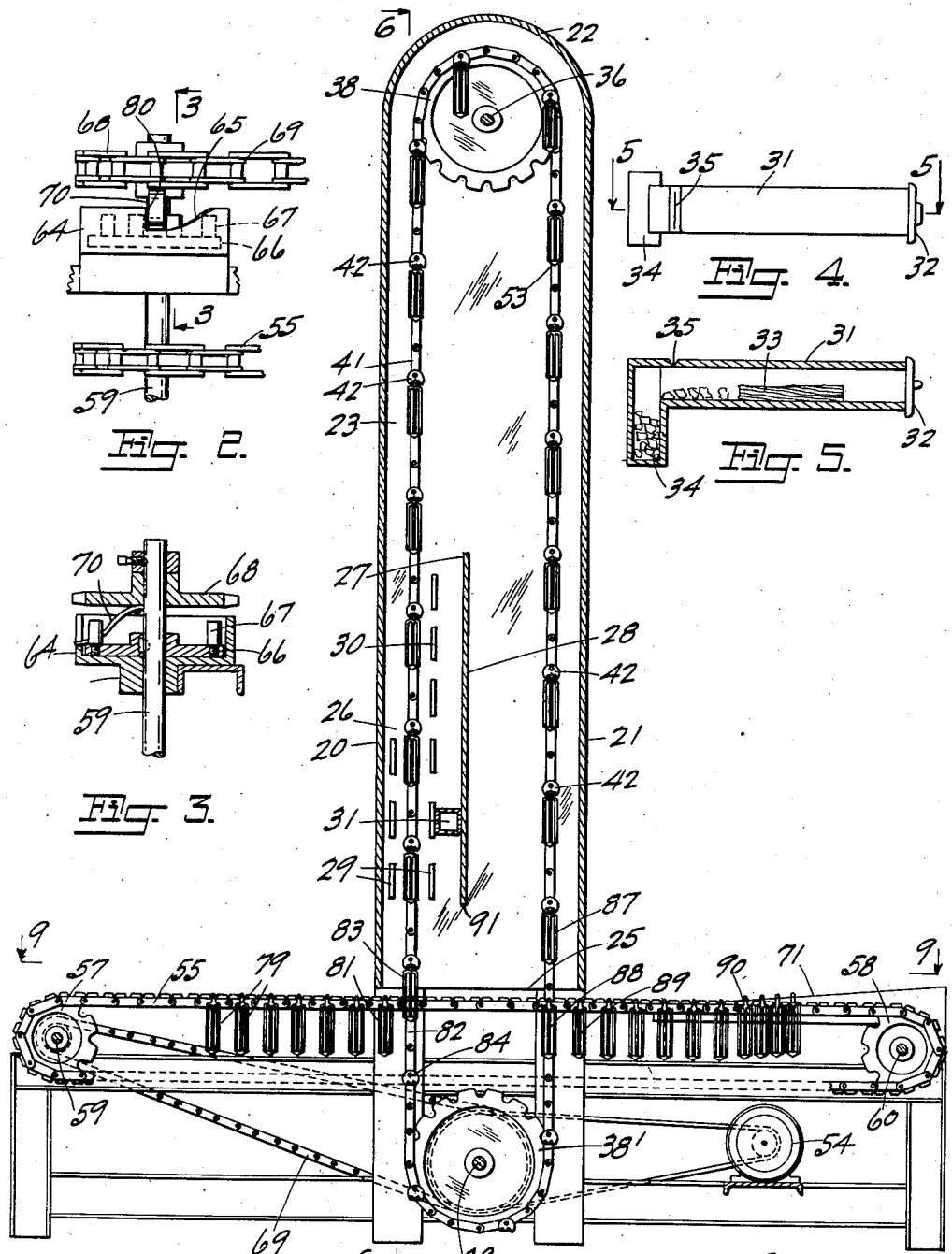

Dec. 6, 1938.   K. E. BEMIS   2,138,813
BARBECUE MACHINE
Filed April 19, 1938   3 Sheets-Sheet 2

Inventor
Kenneth E. Bemis
By Philip R. Riddell
Attorney

Dec. 6, 1938.　　　K. E. BEMIS　　　2,138,813
BARBECUE MACHINE
Filed April 19, 1938　　　3 Sheets-Sheet 3

Inventor
Kenneth E. Bemis
By Philip R. Driedell
Attorney

Patented Dec. 6, 1938

2,138,813

UNITED STATES PATENT OFFICE 2,138,813

BARBECUE MACHINE

Kenneth E. Bemis, Oakland, Calif.

Application April 19, 1938, Serial No. 202,910

20 Claims. (Cl. 53—5)

This invention, a barbecue machine, is specifically designed for roasting, frying, braising and barbecuing meats, and includes a retort for destructive distillation of wood for supplying the smoke for barbecuing operations.

This machine includes automatic feeding and discharging means, and is intended primarily for barbecuing and cooking meats in comparatively thin slices or slabs, preferably an inch or less in thickness, and conducted in a flueless and doorless oven obviating any possibility of changes in temperature as occurs when doors are opened. Due to the fact that the only opening is in the bottom of the oven, through which opening the meat is introduced and discharged, there can be no circulation between outside air and the interior of the oven when the oven is heated, all circulation taking place within the oven.

The specific arrangement of heating units and meat carriers subjects both sides of the meat simultaneously to an intense radiant-heat searing or braising action at the beginning of the cooking process and then continues the cooking in the presence of a normal and uniform circulating heat, in this way differing from the usual methods of continuous radiant or non-radiant heat or direct conductive heat.

In the process of barbecuing or roasting meats, two methods of basting are used, in one of which steam is admitted or liquid sprayed or otherwise applied during the cooking process, and, in the other of which, the fats and juices from one portion of meat are permitted to drip onto the next portion beneath it.

In this machine, basting is entirely dispensed with, and the fats and juices are purposely prevented from dripping onto other portions of meat, and the meat portions are maintained out of association with their rejected juices, resulting in a more delectable and juicy product with less loss in weight and with distinctive flavor.

These results cannot be obtained to the same desirable extent when the meat is first seared on one side and then on the other, or exposed for searing by rotation of the meat relative to the heating units, or if any basting is introduced, or if the meat is subjected to either its own juices or to the juices from another portion of meat.

Therefore, the objects of this invention are, to cook meat in a flueless and doorless oven, without any opening or means of ventilation or escape of gases or circulation with outside air other than in the very bottom of the oven through which the meat is introduced and removed, and to cook the meat preferably in the form of comparatively thin slices or cuts, preferably an inch or less in thickness, to expose the meat initially on both sides simultaneously to an intense searing or braising heat and to continue and complete the cooking by the heat derived by circulation from the source of searing heat but in a zone removed therefrom; to prevent any type of basting action on the meat during the cooking process; to carry out the entire cooking process including feeding and discharge of meats automatically; and to generate smoke in a retort heated by the source of braising heat and free of ventilation, for barbecuing operations.

In describing the invention, reference will be made to the accompanying drawings in which:

Fig. 1 is a sectional elevation through the machine.

Fig. 2 is a plan view of the clutch for the horizontal, or feed and discharge conveyor.

Fig. 3 is a section taken on line 3—3 of Fig. 2.

Fig. 4 is a plan view of the smoke-producing retort.

Fig. 5 is a section taken on line 5—5 of Fig. 4.

Figure 6:
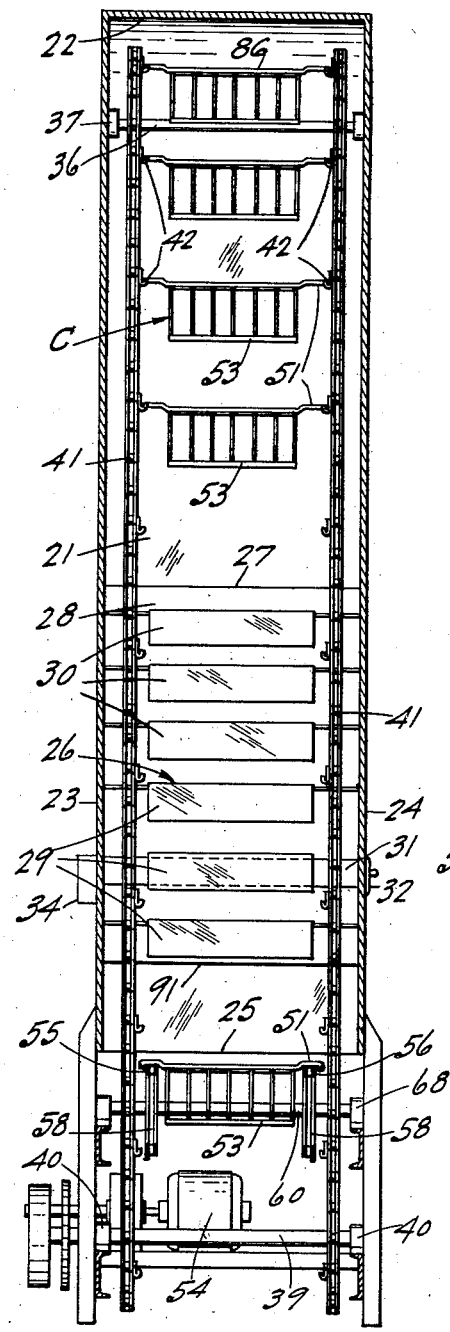
Fig. 6 is a section taken on line 6—6 of Fig. 1.

The invention comprises; an oven which has front and rear walls 20 and 21, a top wall 22 and side walls 23 and 24, the walls being continuous and uninterrupted, without either flues, doors or ventilators, thereby removing any possibility of introducing cold air at any time during the cooking process, the only opening being in the bottom of the oven 25, through which the meat for cooking is introduced and removed.

This oven consists of a searing or braising zone extending upwardly to a point 26, an additional, fat-searing zone extending from point 26 to a point 27 which corresponds to the plane of the top of the baffle 28, which baffle establishes these zones as distinct from the normal cooking zone extending throughout the remainder of the oven.

The intense searing or braising zone up to point 26 is provided with electrical heating units 29 on both sides of the upward path of travel of the meat for simultaneously intensely searing both sides of the meat, and the fat searing zone has heating units 30 located only on one side of the path, and the meat is passed through the oven with the fat side (when there is a fat side, as in spare-ribs) toward the units 30. If there is no fat side, the units 30 are not energized.

The baffle 28 has its lower end spaced above the bottom 25 of the oven just sufficiently to permit circulation of heat within the oven about the baffle, and since there is no circulation of air through the oven, the entire interior of the oven is heated by the heating units to a suitable degree for continuation and completion of the cooking process, thus forming three cooking zones, including double searing, single searing, and moderate cooking or baking zones.

Mounted in direct association with one of the heating units 29 is a retort 31 which is provided with a door or closure 32 at one end for inserting wood 33, such as hickory for producing smoke by destructive distillation, and has a receiver 34 at its other end for receiving refuse, and which seals that end of the retort.

The only opening in this retort, when the receiver 34 is attached and door 32 closed, is a very narrow slit 35 located preferably near the receiver end, and which has only sufficient area to permit escape of smoke while preventing admission of air to prevent actual combustion of the wood.

Copending application, Serial No. 181,517, filed December 24, 1937, discloses a similar arrangement of retort with the exception of the arrangement of the slit, and although small holes could be used, it was found that the very fine slit is more effective in preventing combustion than even very small holes, and the V-shape slit is easily formed and easily cleaned.

Figure 7:
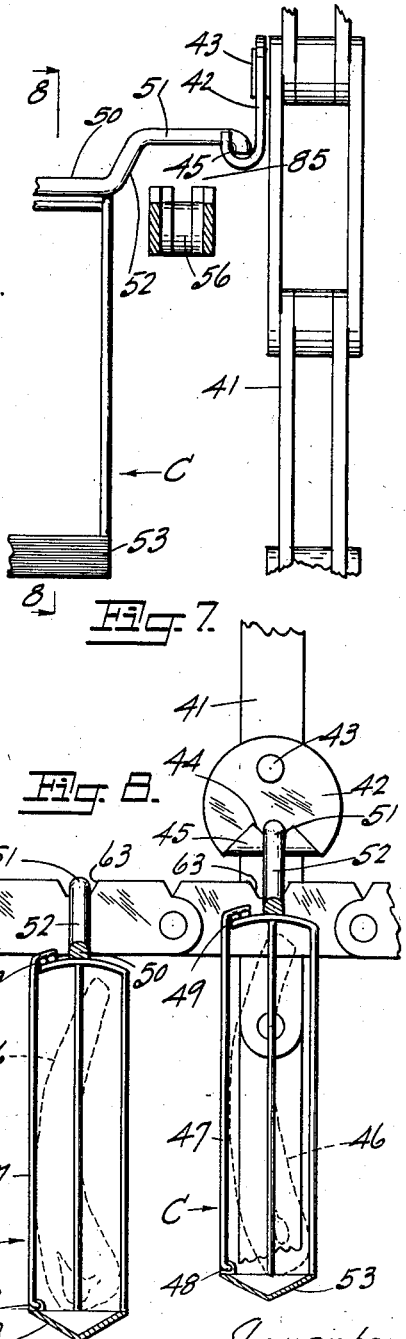
Fig. 7 is an enlarged fragmentary view of the transfer means operating between the horizontal and vertical conveyors.
Figure 8:
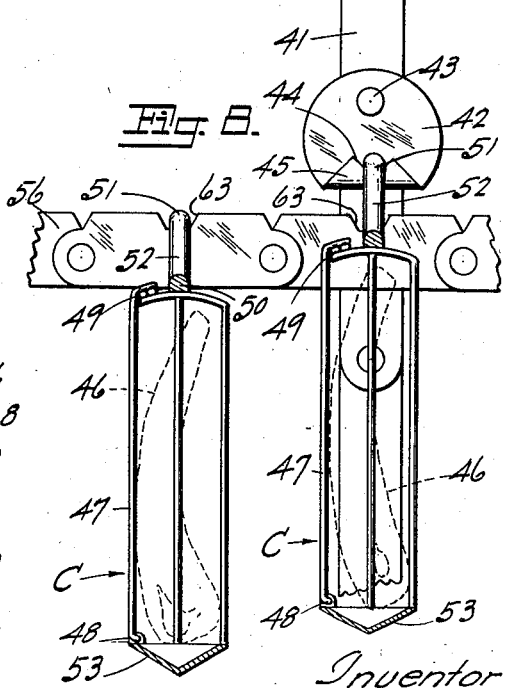
Fig. 8 is a section taken on line 8—8 of Fig. 7.
Figure 12:
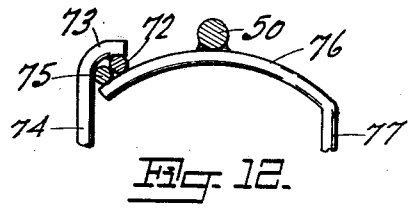
Fig. 12 is an enlarged fragmentary view showing the means for latching the door of the carrier in closed position.
Figures 10, 11:
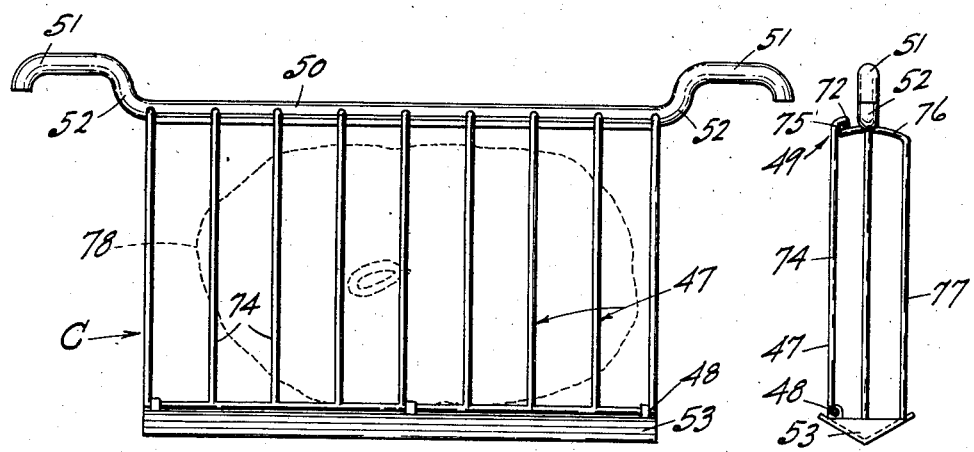
Fig. 10 is a front elevation of one of the meat carriers or baskets.
Fig. 11 is an end elevation of Fig. 10.

The transporting means for carrying the meat through the oven comprises; a shaft 36 which is mounted in bearing 37 in the upper portion of the oven and which shaft carries sprockets 38; a shaft 39 mounted in bearings 40 below the bottom 25 of the oven and carrying sprockets 38'; chains 41 operating about the upper and lower sprockets 38 and 38' and provided with carrier attachments 42 which are pivoted in registrably-related pairs to the chains as indicated at 43 and which are provided with V-slots 44 formed in the top edge of a U-bent portion 45; the attachments having sufficient weight and freedom on their pivots to gravitationally remain always in receiving and releasing position as illustrated in Figs. 7 and 8.

The baskets or carriers C for carrying the cuts of meat 46 through the machine consist of a wire frame, the front 47 of which is hinged at its lower end 48 to provide for introduction of the meat 46 in a reclined position, the front 47 latching onto the top of the carrier as indicated at 49; and a pickup arm 50 projects beyond both ends of the carrier, terminating in an upturned lifting finger 51 with intervening centering portion 52. A receptacle or pan 53 forms the bottom of the carrier and catches all greases and juices from the meat and prevents dripping of such greases and juices onto the meat below; the pans being preferably V-shaped and as shallow as is consistent with the maximum amount of juices which might be exuded from a cut of meat, so as to keep the lower edge of the meat as much as possible out of association with the juices.

These carriers are preferably made about one inch between the front and back and of suitable length and height to receive the largest size cuts which the machine is to handle.

The vertical conveyor, or transporting means is driven by motor 54 which is provided with sufficient speed reduction to transport the meat through the oven slowly enough to permit complete cooking in one pass, and may vary, according to the size and kind of meat up to an hour or so.

Figure 9:
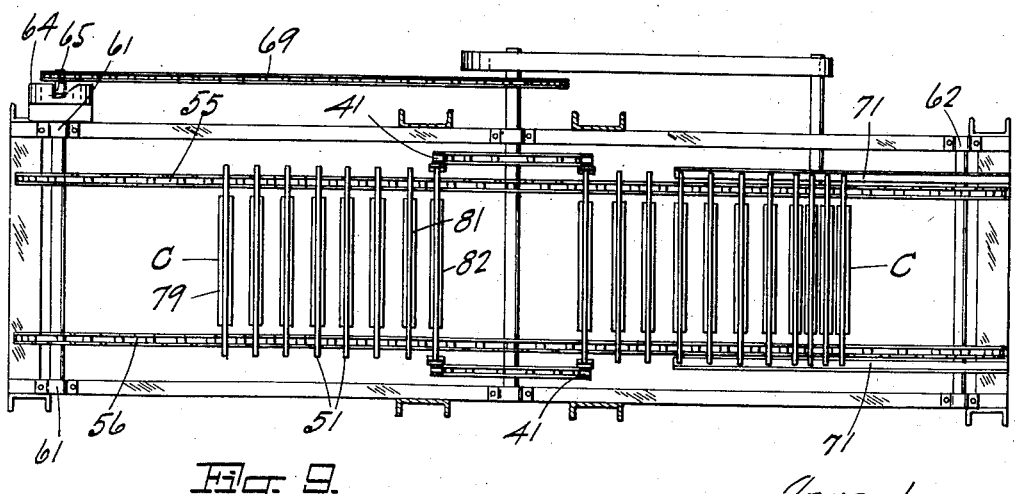
Fig. 9 is a section taken on line 9—9 of Fig. 1.

The feeding mechanism for feeding the transporting conveyor automatically, consists of a horizontal conveyor comprising two parallel strands 55 and 56 of conveyor chain which operate between the strands of the vertical conveyor as is clearly illustrated in Figs. 6, 7 and 9, and operate over the spaced apart sprockets 57 and 58 which are oppositely located relative to the oven, one end of this conveyor functioning as delivery means and the other end as discharge means.

These sprockets 57 and 58 are respectively fixed on the shafts 59 and 60 which are supported in bearings 61 and 62.

The chains 56 are provided with spacers or locators for the lifting fingers 51, such as grooves 63 for suitable spacing and location of the carriers C for feeding to and removing from, the vertical or transporting conveyor, and may consist of these V-grooves, or pins or lugs (not shown).

The horizontal conveyor is actuated in correct sequence for delivery and reception of carriers, by means of a clutch, which consists of a stationary drum 64 provided with a rim having a cam track 65; and inside this drum is a disk 66 which is provided with a series of equi-angularly spaced pins 67, and which disc is keyed to the shaft 59.

A sprocket 68 is rotatably mounted on the shaft 59 and driven by a chain 69 from the shaft 39 to assure synchronous cooperation between the two conveyors, and a leaf spring 70 is affixed to the sprocket 68 and cooperates with the rim of the drum 64 and its cam track 65, and, with one of the pins 67 when the spring is riding up the cam surface 65.

A track 71 is mounted outside and in cooperative relation, to each chain 55 along the discharge end and is inclined upwardly as is clearly illustrated in Fig. 1, to form an accumulator for the carriers C and which lifts the carriers from the conveyor as the conveyor urges them successively toward the tail end of the machine, this arrangement protecting the conveyor and minimizing the storage space required.

The operation of the machine is carried through as follows: Each carrier is loaded by pressing down on the top, whereby the latch rod 72, which is welded to the inturned ends 73 of the front uprights 74, is released from the catch rod 75 which in turn is welded to the top bars 76 which are formed as a continuation of the rear uprights 77, permitting the front to be swung open. The carrier is then laid back down and the meat 78 is laid therein and the front closed and latched, the meat being cut to suitable thickness to just fit between the front and back grids of the carrier so that it will be held in vertical position, or edgewise, and be prevented from sagging or sliding toward the bottom of the carrier.

The carriers are then placed in position in the horizontal conveyor as indicated at 79, with the lifting fingers located in the recesses 63, these arms projecting from opposite sides to almost the distance between the chains 41 of the vertical conveyor.

The heaters 29 and 30 are then energized and the motor 54 is cut in circuit, driving the vertical conveyor 41 and the sprocket 68 at very low speed.

With each revolution of the sprocket 68, the spring 70 snaps over the edge 80 of the cam drum and drops back of one of the pins 67 and moves the pin forward, thus driving the shaft 59 and conveyor chains 55 and 56 until the spring 70 has ridden up on the cam surface 65 high enough to release the pin. This action moves the horizontal conveyor chains just far enough to carry the carriers C forward a distance equal to the distance between two carriers, as from position 81 to position 82, and this occurs just as soon as the preceding carrier 83 has been carried up sufficiently high to clear the next carrier 81.

With the carrier 81 moved to position 82, the next pair of attachments 84 are brought up by the chains 41, and upon reaching the lifting fingers 51 of the carrier, engage and lift the carrier off the conveyor as illustrated at 85 in Fig. 7.

As the carriers pass between the front and rear heating units 29, the meat is seared or braised simultaneously on both sides and with equal degree of radiant heat, the units 30 not being used for lean meats, but mainly for meats such as spare ribs, in which case the fat side of the meat is placed in the machine to be presented to the heat of the units 30 to try out more of the grease.

After passing through this searing or braising zone, the cooking is continued through the medium of the heat derived from the heating units by circulation within the oven, the carriers continuing on up to the upper end of the oven and carried thereabout in their suspended positions as indicated at 86, the position being maintained to prevent spilling of grease and juices from the receptacles 53.

During this entire cooking process, no basting of the meat is conducted in any manner, and the juices and grease from the separate portions of meat are collected in the individual receptacles 53, so that none of these juices are permitted to drop or drip onto the cuts of meat below, and the only moisture which can reach the meat is the moisture in the heated air which moisture is derived from evaporation of a portion of the watery juices exuded by the meat during the cooking process.

The baffle 28 prevents any direct transfer of heat from the heating units after the carriers have left the braising zone, and due to the confined space between the baffle and the front wall 20, unusually high efficiency is secured in the braising zone, and due to the fact that the bottom of the baffle is located in a plane above the bottom of the oven, circulation is confined to the interior of the oven, the heat passing up through the braising zone and down the back side of the baffle, around the bottom of the baffle and back up through the braising zone, maintaining the entire interior of the oven other than the braising zone at a suitable cooking or baking temperature.

The carriers reach a position 87 at the lower end of the back of the oven at the instant that operation of the conveyor 55, 56 starts one of its intermittent operations and which carries the carrier 88 back to the position 89, and carrier 87 continues to move down until the fingers 51 are resting in slots 63, at which time the horizontal conveyor is again brought into operation.

As the horizontal conveyor moves the carriers back and one of the carriers 90 reaches the upwardly inclined track 71, the ends of the lifting fingers 51 cooperate with the inclined track and the conveyor forces the carrier up the incline until released by the conveyor, and thus each succeeding carrier pushes the preceding carrier forward and up the incline, thus requiring a minimum amount of space for the finished products.

The bottom edge 91 of the baffle 28 is located a sufficient distance above the bottom of the oven to induce circulation of heat within the oven, without admission of introduction of outside air, this distance being not less than six inches. Without this arrangement, there could be no circulation within the oven.

If the meat is to be barbecued, small pieces of wood, such as hickory are placed in the retort 31 and retorted by means of the heat of a heating unit 29 with which it is directly associated, the smoke escaping through the small slit 35 into the oven, there being no actual combustion of the wood. Products of distillation, such as tar, and the charcoal are passed to the receiver 34, which is removable for emptying.

The following copending applications are related to this application; Serial Number 181,517, filed December 24, 1937, for Barbecue furnace; Meat carrier for meat cookers, Serial Number 202,911, filed April 19, 1938; Process of cooking meats, Serial Number 202,913, filed April 19, 1938.

It will be understood that variations in construction and arrangement of parts, which variations are consistent with the appended claims, may be resorted to without detracting from the spirit or scope of the invention, or sacrificing any of the advantages thereof.

I claim:

1. A barbecuing machine, in combination, an oven having continuous walls with an opening in the bottom only, for introduction and removal of meat, and having a centrally disposed baffle extending from a plane spaced from the bottom of the oven to an intermediate height within said oven to define a braising zone and to induce circulation entirely within said oven; opposed travel paths for meat on opposite sides of said baffle; transporting means operating along said travel paths and forming defining means therefor, and including carrier means carrying portions of meat in vertical or edgewise position and means collecting individually the juices exuded from each portion of meat to prevent said juices from dripping onto other portions of meat therebelow; heating units arranged in said braising zone on opposite sides of said transporting means therein and extending throughout only a minor portion of one of said travel paths existing in said braising zone and forming an initial braising zone, whereby an intense braising and searing action is initially applied to the meat simultaneously on both sides, the cooking being continued and completed in the heat derived from, but out of direct relation to, said heating units.

2. A barbecuing machine as defined in claim 1; a wood retort in conductive association with one of said heating units and having an escape opening for delivering smoke into said oven and being sealed against air circulation to prevent combustion of wood therein.

3. A barbecuing machine as defined in claim 1; a second set of heating units located above said first-named set and located only on one side of the path of travel and extending through another minor portion of said path, forming a secondary or fat braising zone for the fat portions of meat, for the extraction of additional grease.

4. A structure as defined in claim 1; delivery and discharge means operating in cooperative relation to said transporting means, delivering and receiving said carrier means respectively to and from said transporting means for automatic feeding thereof.

5. A barbecuing machine comprising; a flueless and doorless oven of substantially small cross-sectional area and of considerable height and having an opening in the bottom for introduction and removal of portions of meat and being otherwise completely sealed to prevent circulation of air through said oven, said oven having a central baffle extending from a plane a limited distance above said bottom to a point intermediate the height of said oven and defining a braising zone on one side thereof and an upward path of travel therein, and a downward path of travel on the other side of said baffle; heating means located on both sides of said upward path to a predetermined height within the limits of the height of said baffle creating an intense initial braising zone and supplying heat by circulation throughout the balance of the interior of the oven and about the bottom of said baffle limiting the circulation to the confines of said oven; and transporting means including removable carriers carrying portions of meat in a vertical or edgewise position about said travel paths and timed to complete the cooking process in one pass therethrough.

6. A machine as defined in claim 5; delivery and removal means and operating means therefor delivering said carriers to said transporting means for transportation about said paths and removing said carriers after they have completed their pass therethrough.

7. A device as claimed in claim 5; a wood retort associated directly with said heating means and having an opening at one end only and of sufficient area only to permit escape of smoke into said oven during the destructive distillation of the wood without permitting introduction of air in suitable quantity to promote combustion of the wood.

8. A device as claimed in claim 5; said heating means comprising electrical heating units arranged in two sets in superposed relation, the lower set of which consists of units located on both sides of said upward path to form an initial braising zone to braise both sides of the portions of meat with equal intensity simultaneously; and the upper set of which consists of units located only on one side of said upward path forming a secondary braising zone for additionally braising fat sides of portions of meat.

9. A device as claimed in claim 5; said transporting means comprising a conveyor, with said carriers formed to retain said portions of meat in vertical or edgewise position while carried through said oven; said carriers being freely removable and replaceable from and on said conveyor when in a position below the bottom of said oven; said carriers including means collecting and retaining the juices exuded from the portions of meat to prevent discharge of juices from one portion of meat onto another portion therebelow.

10. A barbecue machine comprising; a vertical oven having an opening in the bottom for introduction and removal of meat and having a central baffle extending from a plane located above said bottom to induce circulation entirely within the confines of said oven, and extending upwardly to a plane intermediate the height of said oven; a pair of coaxial sprockets mounted within said oven and adjacent the top thereof, and a second pair of sprockets mounted below the bottom of said oven and chains cooperating between the respective pairs; carrier attachments pivotally mounted on said chains and gravitationally maintained in carrier supporting position; carriers suspendedly supported by said carrier attachments and having closely-related grid type front and back walls retaining portions of meat therebetween in vertical or edgewise position; and a set of heating units located on each side of said chains on one side only of said baffle and within the limits of the height of said baffle, forming an initial braising zone, and supplying heat by circulation within the confines of said oven for continuing and completing the cooking of said portions of meat.

11. A structure as claimed in claim 10; said carriers each having a receptacle forming the bottom for receiving juices exuded by said portions of meat and retaining said juices against discharge or dripping onto portions of meat therebelow; said vertical arrangement of said portions keeping said portions out of its exuded juices and exposing both sides of the portion simultaneously to the braising action of said heating units.

12. A structure as claimed in claim 10; and a second set of heating units located above one of said first-named sets and within the limits of the height of said baffle, forming a secondary braising zone for additional braising of one side of the portions of meat.

13. A structure as defined in claim 10; carrier delivery and discharge means cooperatively related to said conveyor chains and delivering carriers to the upward traveling strands of chain and receiving and removing carriers from the downwardly-traveling strands of chains, and driving means for said delivery and discharge means and for said sprockets and chains.

14. A structure as defined in claim 10; carrier delivery and discharge means cooperatively related to said conveyor chains and delivering carriers to the chains on one side and receiving carriers and removing them from the chains on the other side, and driving means for said delivery and discharge means and for said chains; each of said carriers having laterally extending supporting and centering fingers for support by said carrier delivery and discharge means and cooperatively related to said carrier attachments.

15. A structure as defined in claim 10; carrier delivery and discharge means cooperatively related to said conveyor chains and delivering carriers to the chains on one side and receiving and removing carriers from the chains on the other side, and driving means for said delivery and discharge means and for said chains; and means associated with the discharge portion of said delivery and discharge means, receiving said carriers from said discharge means for independent support thereof.

16. A barbecue machine having an oven of considerable height and comparatively small cross-section and having an opening in the bottom for introduction and discharge of meat for cooking, and a baffle centrally located and extending vertically from a plane a predetermined distance above the bottom of the oven to a plane intermediate the height of the oven; a vertical conveyor operating within said oven and straddling said baffle and extending below the bottom of the oven; heating units located in the space on one side of said baffle and on both sides of the conveyor portion located therein; carrier attachments pivotally associated with said conveyor and gravitationally maintained in carrier-cooperative position; and carriers having a combined centering and supporting means associated with the upper end thereof and extending from both ends for dependent support of said carriers by said attachments, and having front and back grid-type walls closely related to support a cut of meat edgewise to expose both sides of the meat equally and simultaneously to said heating units for initial braising.

17. A structure as claimed in claim 16; a wood retort associated with said heating units and having a feed opening and sealing means therefor, a discharge opening and sealing means therefor, and a single, minimum-area, smoke-escape passage opening into said oven to permit escape of smoke and prevent introduction of air for combustion within said retort.

18. A structure as claimed in claim 16; a horizontal conveyor operating in cooperative relation to said vertical conveyor for moving said carriers into and out of cooperative relation to said carrier attachments; and driving means continuously driving said vertical conveyor and intermittently driving said horizontal conveyor.

19. A structure as claimed in claim 16; a horizontal conveyor operating in cooperative relation to said vertical conveyor for moving said carriers into and out of cooperative relation to said carrier attachments; driving means continuously driving said vertical conveyor and intermittently driving said horizontal conveyor; and upwardly inclined tracks related to said horizontal conveyor and supportingly related to said carriers and receiving and supporting said carriers after removal from said vertical conveyor; said carriers being gathered in direct contact on said tracks.

20. In a food cooking machine; a vertical conveyor comprising coaxial upper sprockets and coaxial lower sprockets and chains operating between said upper and lower sprockets; dependent carrier attachments pivotally mounted on said chains in registrable relation on the chains; a horizontal conveyor having head and tail sprockets and chains operating therebetween and between the chains of said vertical conveyor; locating means on said chains for said horizontal conveyor; carriers having laterally-extending arms receivable by said locating means for transportation to, and location relative to said attachments to be picked up thereby, and for reception therefrom for removal from said vertical conveyor; means driving said vertical conveyor continuously, and driving said horizontal conveyor intermittently to place and remove said carriers in timed sequence.

KENNETH E. BEMIS.